Patented Aug. 8, 1933

1,921,324

UNITED STATES PATENT OFFICE 1,921,324

WOOD PRESERVING MEDIA

Curt Räth, Opladen near Cologne, and Franz Heckmanns, Leverkusen near Cologne, Germany, assignors to Winthrop Chemical Company, Inc., New York, N. Y., a Corporation of New York No Drawing. Application April 16, 1930, Serial No. 444,865, and in Germany April 22, 1929

4 Claims. (Cl. 134—78.6)

This invention relates to new wood preserving compositions.

The use of many organic substances, in particular of nitro-compounds, as wood preserving media is attended with great difficulties on account of the extraordinarily ready combustibility and spontaneous inflammability thereof, affecting the grinding, packing and transport. Thus it is known that nitro-phenols or poly-nitro-phenols can be employed as wood preserving agents, but the extraordinarily ready inflammability thereof involves, considerable difficulties with the result that in certain cases their use is rendered extremely difficult or even impossible.

In accordance with the present invention new and valuable wood preserving media are prepared by incorporating with a nitro-phenol or a poly-nitro-phenol an organic acid amide or a substitution product thereof, said organic amides exerting an extraordinarily strong influence in decreasing the inflammability and spontaneous combustion without affecting the wood preserving properties. For example, thus it is possible, by intimately mixing urea with the extremely easily inflammable and dangerous sodium p-nitrophenolate to raise the flash point and ignition temperature to 170° C. and thus to obtain a new composition for preserving wood. Poly-nitro-phenols behave quite similarly.

The process is of particular advantage in so far as readily accessible compounds, such as for example, urea acet-amid and the like can be employed.

Obviously the amount of acid amide to be added is governed by the nature of the respective nitro-compound, but generally one part of the acid amide for each part of the nitro-phenol is sufficient.

According to the specific material to be preserved the preserving compositions are applied in the usual manner, for example, by dissolving the compositions in water and impregnating the wood by means of pressure or in a vacuo. The quantities to be added of the preserving media may vary within wide ranges. In carrying out our invention every one skilled in the art will, without difficulty, be able to find a suitable concentration.

The invention is illustrated by the following examples, without being limited thereto:—

Example 1.—100 parts by weight of sodium p-nitrophenolate are intimately incorporated with 100 parts by weight of urea. While the nitro-phenol compound, even at normal temperature, ignites extremely readily and continues to burn briskly the new composition possesses an ignition temperature of 170° C. and represents a highly efficacious preserving agent for wood.

Example 2.—100 parts by weight of sodium dinitrophenolate are intimately incorporated with 200 parts of urea. This composition, in contradistinction to the nitro-phenol compound which ignites extremely readily, can only be ignited at a high temperature and by contact with an open flame.

In this example urethane can be used with the same success.

We claim:

1. As a new composition of matter an organic nitrophenol compound intimately mixed with an organic acid amide, being a valuable agent for preserving wood.

2. As a new composition of matter sodium-p-dinitrophenolate intimately mixed with urea, being a valuable agent for preserving wood.

3. As a new composition of matter a homogenous mixture of 100 parts by weight of sodium p-dinitrophenolate and 200 parts by weight of urea, being a highly efficacious agent for preserving wood.

4. As a wood preserving agent an intimate mixture of an organic nitrophenol compound and an organic acid amide.

CURT RÄTH.
FRANZ HECKMANNS.